April 5, 1966  C. GRAY, SR  3,244,269
CONVEYOR SYSTEM AND MEANS
Filed Oct. 14, 1963  7 Sheets-Sheet 1

INVENTOR,
CORNELIUS GRAY SR;
BY
ATTORNEY

Fig. 2.

INVENTOR,
CORNELIUS GRAY SR;
BY
ATTORNEY

INVENTOR,
CORNELIUS GRAY SR;
BY
ATTORNEY

April 5, 1966  C. GRAY, SR  3,244,269
CONVEYOR SYSTEM AND MEANS
Filed Oct. 14, 1963  7 Sheets-Sheet 5

INVENTOR,
CORNELIUS GRAY SR;
BY
ATTORNEY

April 5, 1966  C. GRAY, SR  3,244,269
CONVEYOR SYSTEM AND MEANS
Filed Oct. 14, 1963  7 Sheets-Sheet 6

INVENTOR,
CORNELIUS GRAY SR;
BY
ATTORNEY

April 5, 1966  C. GRAY, SR  3,244,269
CONVEYOR SYSTEM AND MEANS
Filed Oct. 14, 1963  7 Sheets-Sheet 7

FIG. 24.

INVENTOR,
CORNELIUS GRAY SR;
BY
ATTORNEY

United States Patent Office 3,244,269
Patented Apr. 5, 1966

3,244,269
CONVEYOR SYSTEM AND MEANS
Cornelius Gray, Sr., 12810 Venice Blvd.,
Los Angeles, Calif.
Filed Oct. 14, 1963, Ser. No. 315,925
16 Claims. (Cl. 198—177)

The present invention relates to a conveyor of particular use in laundry departments for the purpose of lifting the laundry from one level to a further level or levels. By way of example, I may refer to a building having several floors and wherein the soiled linen is secured to the conveyor for delivery to another level for washing. I contemplate that laundry so handled should be placed in bags holding laundry of a certain weight. These bags are sequentially and in timed relationship by the novel means of my invention, delivered by a horizontal monorail to a vertically moving pick-up system which automatically delivers the filled bag at a selected level. In carrying out my invention and objects thereof, as hereinafter set forth, I have devised what I term as monorail load trolleys so designed as to be transferred automatically from a horizontal monorail to a lifting hook which lifts the monorail load trolley and the load carried thereby to a preselected level for release of the load trolley at said level. I also contemplate a return of all unloaded trolleys to the lower level for reuse in timed sequence.

I have simplified the conveyor system and means in such a manner as to provide for efficiency, inexpensiveness of construction and easy erection thereof as well as a conveyor system and means which will operate over long periods of time without frequent repairs due to breakdowns and the like.

An object of my invention is to provide a conveyor system and means which will not be hazardous to operators.

A further object of my invention is to provide a conveyor system and means which will transport loads from a lower level to a higher level for automatic discharge of the load at the selected level quickly, efficiently and with a minimum of a workman's supervision.

A further object is to provide a conveyor system and means wherein the means for carrying a load, when released of the load, may be automatically returned to a loading zone.

A further object is the provision of a conveyor system and means so arranged as to act as a classifier for a load.

A further object is a conveyor system and means which is simple to fabricate in that standard parts readily obtainable on the market are utilized in a major portion of its construction.

A further object is the provision of a conveyor system and means wherein any malfunction of apparatus immediately stops conveyor operation.

With the above and other objects in view, the invention provides a conveyor system and means which is inexpensive in cost of manufacture, simple of construction, and generally superior to conveyor systems and means now known to the inventor.

With the above mentioned and other objects in view, the invention consists in the novel and useful provision, formation, construction, association and relative arrangement of parts, members and features, all as shown in certain embodiments in the accompanying drawings, described generally and more particularly pointed out in the claims.

Figure 1:
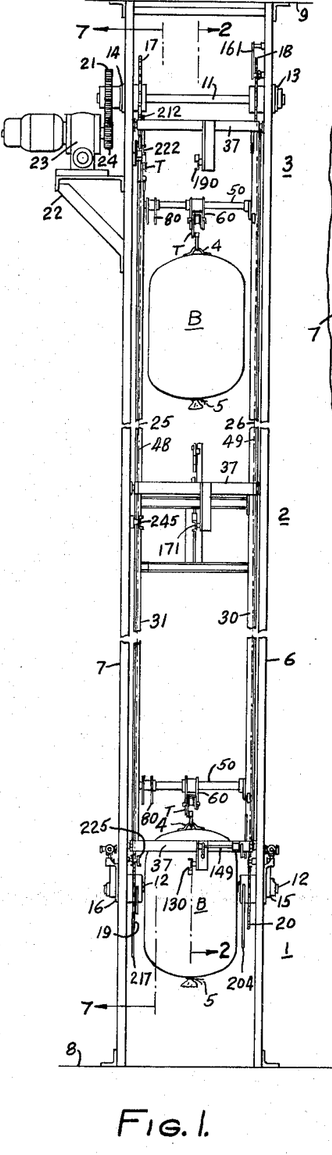
FIGURE 1 is a fragmentary front elevation of the conveyor system and means as an entirety.
Figure 2:
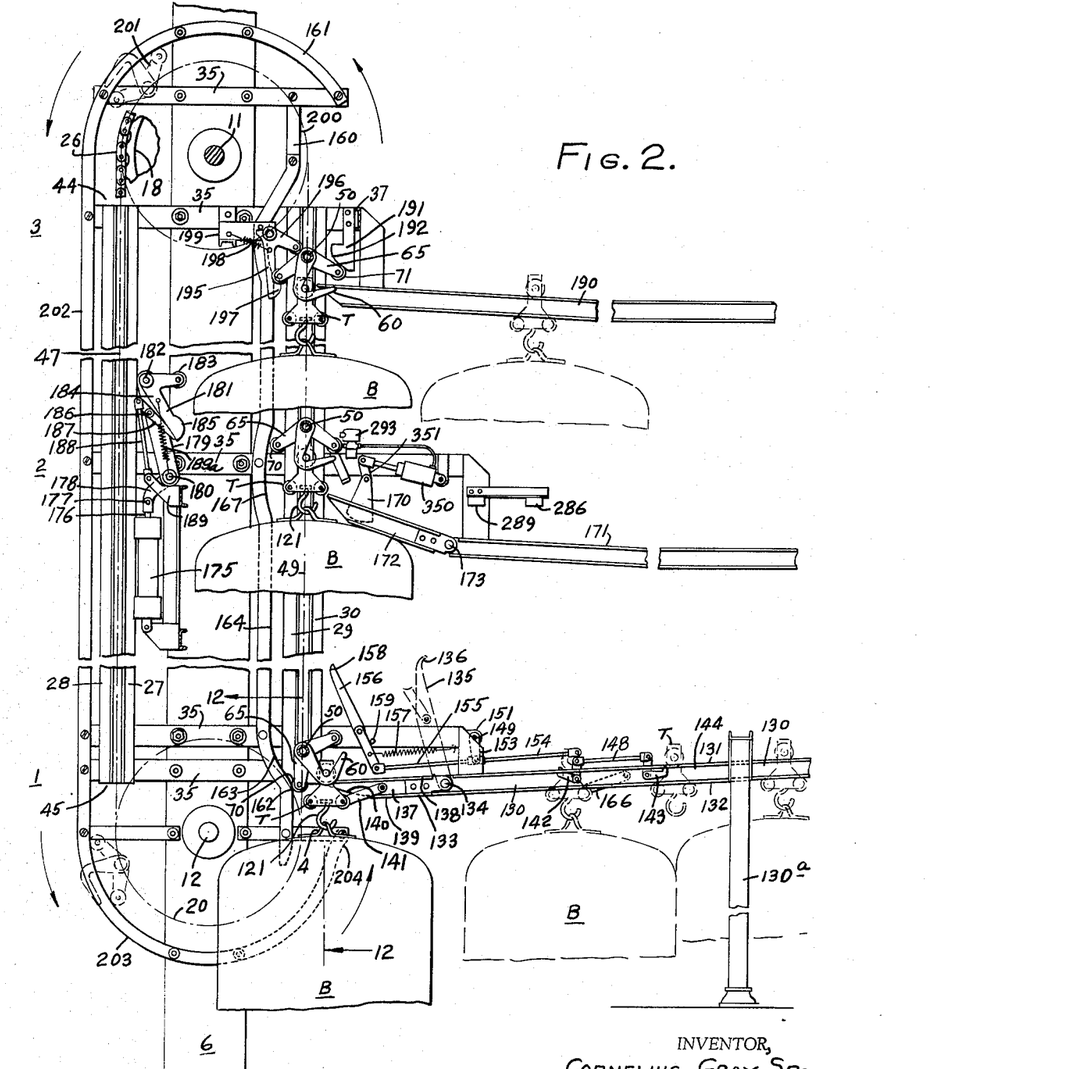
FIGURE 2 is a fragmentary, side elevation of the conveyor system and means, on the line 2—2 of FIGURE 1.
Figure 11:
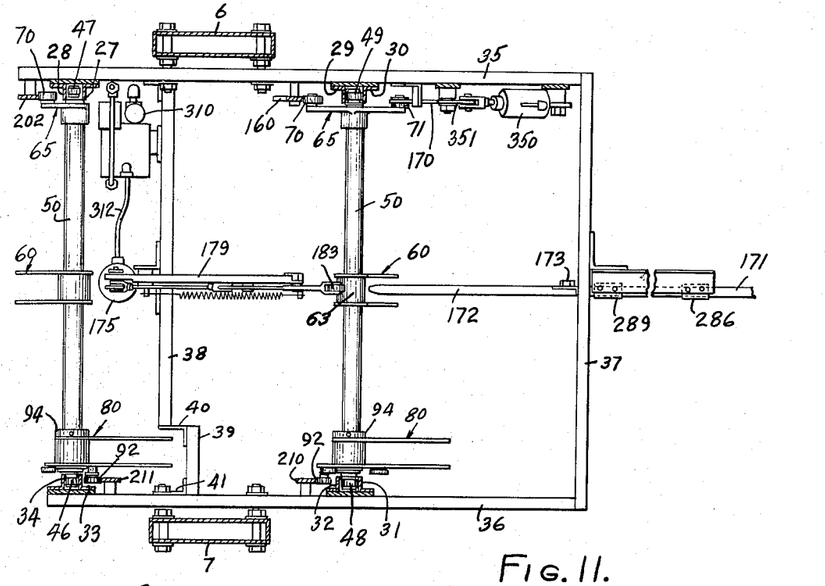
FIGURE 11 is a sectional plan view taken on the line 11—11 of FIGURE 10.
Figure 13:
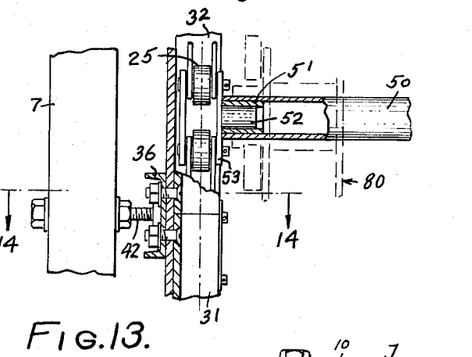
FIGURE 13 is a fragentary, partially sectional view on an enlarged scale, showing certain details of the construction shown in FIGURE 12.
Figure 14:
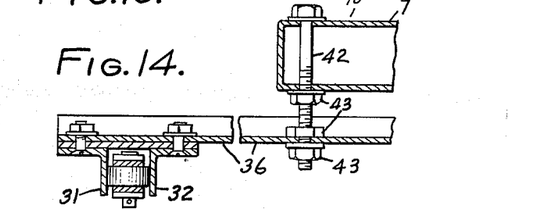
FIGURE 14 is a fragmentary sectional view, on an enlarged scale, taken on the line 14—14 of FIGURE 13.

Referring now to the drawings, I have, for the purpose of illustration in FIGURES 1 and 2, indicated three levels 1, 2, and 3 which may constitute a basement or loading floor, a first or intermediate floor and an upper floor. Primarily, I have in mind a conveyor system and means of use in hospitals, by way of illustration, and wherein soiled linen received at the lower level or basement 1, may be delivered to an upper level such as 2 or 3 for washing, ironing, and other operations. While I have indicated three levels, lower, intermediate, and upper, it is evident that the system may be utilized for any number of levels, or, for that matter, for two levels. Thus, in the case of laundry, I contemplate the use of bags to hold the soiled laundry, which bags may be of a predetermined size both as to length and diameter, with each bag provided with an eye member at its upper end, shown at 4, while the lower or bottom of the bag is tied at 5 with a quick opening draw string so that the bag may be easily opened at any level for discharge of its contents. I have in mind bags which may be 26″ in diameter and 46″ in length, and which will hold approximately one hundred pounds of soiled linen. I contemplate delivering the soiled linen in bags at the lower level or basement 1, to an intermediate or top level 2 and 3 and at a speed of approximately twenty-one feet per minute. To accomplish this, I provide carrier members as hereinafter described which are suitably spaced apart so that the bags containing soiled linen may be elevated from the basement to an intermediate or upper level at the rate of one bag every thirty seconds, or a total of twelve thousand pounds of soiled linen per hour. These figures are given to furnish a clear understanding of the invention and are not to be considered in a limiting sense. Thus, in FIGURE 1, I have selected three levels; to wit: lower, intermediate, and upper, 1, 2, and 3, and have provided supporting posts or columns of which there are a pair 6 and 7 in spaced alignment and extending from the basement or lower level floor 8 to the upper level or levels selected at 9. Thus, 9 may be a ceiling and suitable brackets are provided for anchoring the columns. Any number of columns may be utilized, and in the present instance, two are provided by way of illustration. I have found it expedient to use columns of boxlike construction, as shown in FIGURE 14 at 10. This construction has been found to support great weights and, likewise, be sturdy and stable. In order to elevate the bags, designated as "B," I have provided upper and lower transverse shafts 11 and 12, suitably journalled in the columns 6 and 7, as shown at 13, 14, 15 and 16. Pairs of sprocket wheels 17, 18, 19 and 20 are mounted on their respective shafts 11 and 12 in spaced relationship and lie adjacent the inner facing sides of the columns 6 and 7, as shown in FIGURE 1. As is usual, the sprockets are provided with hubs, which hubs are fixed to their respective shafts 11 and 12 so that rotation of the sprocket wheels will produce rotation of the shaft, or vice versa. In this respect, the shaft 11 at the upper level 3 extends beyond the outer face of the column 7 and carries a gear 21 fixed to the shaft. A platform designated generally as 22 is attached to the column 7 and supports a motor driven gear reduction unit 23 which drives a gear 24 attached to the gear reduction shaft, which gear meshes with gear 21. Extending between upper and lower sprocket wheels 17 and 19, as well as between the sprocket wheels 18 and 20, are continuous link chains 25 and 26. The link chains are confined between pairs of spaced right angle brackets or strips 27, 28, 29, and 30 for one column side 6 and 31, 32, 33, and 34 for the column side 7. All the elongated bracket type strips are of identical construction, and as shown in FIGURE 14, are carried by the columns through the medium of a framing comprising cross supports 35 and 36, which are in parallel relationship, as illustrated in FIGURE 11, and are interconnected to give rigidity by transverse supports at 37 and 38. All of the supports of the framing lie in the same horizontal plane. The transverse support 38 has an offset support 39 interconnected by brackets 40 and 41. The cross supports 35 and 36 are carried transversely of the columns 6 and 7 by means of elongated bolts carrying nuts, as shown generally in FIGURES 11, 13 and 14 at 42 and 43 whereby the cross supports may be relatively adjusted as to spacing therebetween. As shown in both FIGURES 13 and 14, the guide brackets for the link chain are secured by means of bolts to the cross supports. This is true for all of the remaining guide brackets for each side of the column supports 6 and 7. The cross supports, as has previously been stated, are located at the lower, intermediate, and upper levels, and in every instance extend beyond the columns at each side thereof, as shown in FIGURE 14, with the chain guide brackets such as 27 and 28, 29 and 30, terminating at upper and lower levels just prior to chain engagement with the upper and lower sprocket wheels, see FIGURE 2 at 44 and 45. The construction aforesaid, gives a stable structure and one that adequately carries a load or a series of loads when there is chain movement, as hereinafter set forth. For the purpose of convenience of description and understanding of the invention, I have designated the outer stretches of the link chains, that is, the link chain stretches that lie between pairs of upper and lower sprocket wheels at 46 and 47, for chains 25 and 26 respectively, and the inner stretches for chains 25 and 26 as 48 and 49. Spaced apart tubular tie members designated generally as 50, extend between both the outer and inner stretches of the link chains 25 and 26. In other words, tie members 50 are provided in spaced relationship for the entire lengths of the chains 25 and 26. This spacing, of course, will depend upon the size of the load as previously set forth in considering bag size "B." Each tubular tie member 50, see FIGURE 13, has bushed ends 51 which receive studs 52 attached to and projecting from side plates 53 of the link chains 25 and 26. Thus, the tubular tie member is free to rotate on the studs 52. Carried on each tie member 50 and substantially intermediate the ends thereof, is a load hook 60 of the type shown in FIGURES 18 and 19. The position of the load hook is shown in FIGURE 12 and each load hook 60 includes two spaced apart hooks 61 and 62 connected to a hub 63 for mounting the load hook on the tubular tie member 50 and secured in a specific position thereon by any suitable means, such as by a set screw 64.

Figure 12:
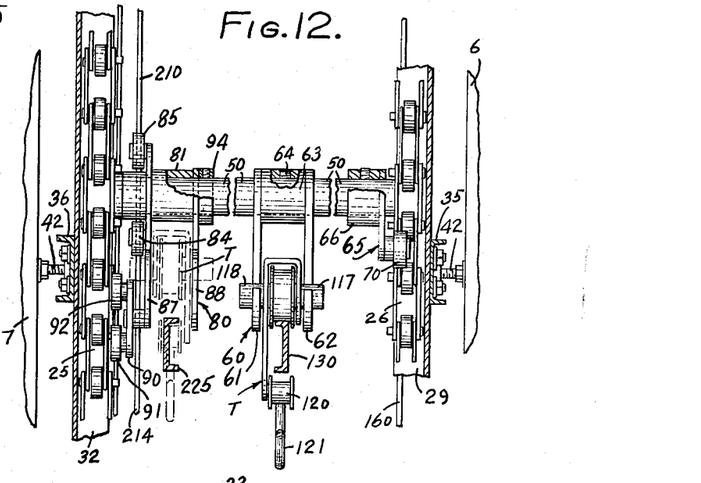
FIGURE 12 is a fragmentary sectional view, on an enlarged scale, taken on the line 12—12 of FIGURE 2.
Figures 15, 16, 17, 18, 19, 20, 21, 22, 23:
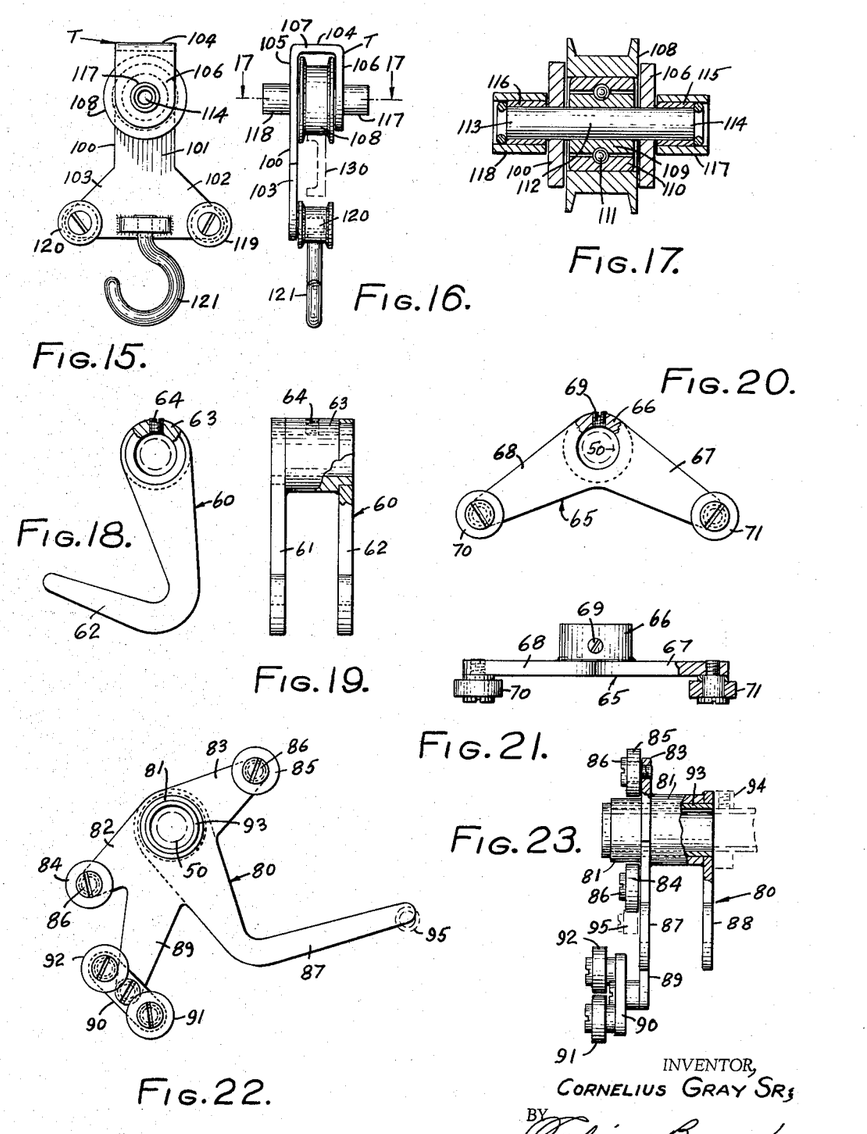
FIGURE 15 is an elevation of a load trolley used in the practice of the invention.
FIGURE 16 is an end elevation of the load trolley of FIGURE 15.
FIGURE 17 is a sectional view, on an enlarged scale, taken on the line 17—17 of FIGURE 16.
FIGURE 18 is a partially sectional side elevation of a load hook used in the practice of the invention.
FIGURE 19 is a front elevation, partly in section, of the load hook of FIGURE 18.
FIGURE 20 is a front elevation, partly in section, of a bell crank or rocker arm for rocking movement of the load hook of FIGURES 18 and 19.
FIGURE 21 is a top plan view, partly in section, of the bell crank or rocker arm of FIGURE 20.
FIGURE 22 is a side elevation of a trolley hook for returning unloaded trolley hooks to a loading level.
FIGURE 23 is an end elevation, partly in section, of the trolley hook of FIGURE 22.

Lying adjacent the link chain 26, as shown in FIGURE 12, is a bell crank or rocker arm of the form shown in FIGURES 20 and 21 and designated as 65. The bell crank includes a hub 66 with two arms 67 and 68 extending therefrom in angular relationship, the hub carrying a set screw 69 or other convenient means whereby the hub may be secured to the tubular tie member 50 at a preselected position. The outer ends of the arms 67 and 68 carry rollers 70 and 71. These rollers are spacedly held to sides of the arms in any convenient manner as illustrated in FIGURE 21. It will thus be seen from the description so far given that rotation of the bell crank or rocker arm will turn the tubular tie member 50 and in so doing will rotate the load hook 60.

Likewise carried on the tubular tie members 50 are hooks of the form shown in FIGURES 22 and 23 for returning unloaded trolleys to the point of loading or the lower level 1. For convenience of description, I shall term the hooks of FIGURES 22 and 23 as light trolley pick-up hooks 80. Each hook 80 includes a hub 81 having two arms extending diametrically from the hub, as shown at 82 and 83, the arm 83 having a greater length than the arm 82, with an end of each arm provided with a roller 84 and 85. These rollers are held in any convenient manner to their respective arms such as by using bearing type screws 86. Extending from the hub 81 are a parallel pair of hooks 87 and 88, spaced apart the same as the spacing for load hooks 61 and 62. It will be noted upon reference to FIGURE 23, that the hook 87 lies in the plane of the arms 82 and 83. An additional arm 89 lies in the plane of the arms 82 and 83 and of the hook 87 and extends outwardly substantially intermediate the hook 87 and the arm 82. Arm 89 carries a turnable arm 90 at its outer extremity and intermediate the length of said arm 90 which arm 90, at its extremity, carries rollers 91 and 92. It will be seen from FIGURE 23 that the rollers 91 and 92 do not lie in the plane of the rollers 84 and 85 but are to one side thereof. The hub 81 is bushed at 93 and the hook 80 considered as an entirety, is mounted on a tubular tie member 50 adjacent the link chain 25. See FIGURE 12. A collar 94 bears against the side of the hub to maintain the position of the hub on the tubular tie member 50. The hub 81 is freely carried upon the tubular tie member 50 so that rotation of said tie member will not produce rotation of the hook 80. In some instances, I provide the extremity of hook 87 with a roller 95 for purposes hereinafter set forth. In considering the hook shown in FIGURE 22, it will be noted that the arm 89 is at an acute angle to arms 82 and 83 and to the hook 87. The reason for the construction of the hook, as aforesaid, will be set forth in the statement of operation.

The load trolley T is detailed as to form in FIGURES 15, 16 and 17 and includes a framing 100 so formed as to have a central member 101 intermediate triangular shaped wings 102 and 103, the intermediate member 101 being provided with a U-bend at the end thereof, as shown at 104. This U-bend provides two sides 105 and 106 and a connecting portion 107 for the confining of a flanged roller 108. The roller 108 has inner and outer races 109 and 110 between which are roller bearings 111, the inner race 109 being mounted upon an axle 112 which extends beyond the sides 105 and 106, as shown at 113 and 114. Ends 113 and 114 are bushed at 115 and 116 and are received within sleeves 117 and 118. The spacing between the sides 105 and 106 of the trolley frame 100 is such that the load hooks 61 and 62 straddle said sides and engage the sleeves 117 and 118 to support the load trolley. See FIGURE 12. This is likewise true for the spacing for the hooks 87 and 88 for the hook structure of FIGURES 22 and 23.

The extremities of the wings 102 and 103 carry flanged rollers 119 and 120 and positioned between the rollers and depending from the framing is a hook 121. This hook is non-rotatable and is fixed as to position so that the hook will lie in the plane of the rollers 108, 119 and 120, as shown in FIGURE 16. The hook is adapted to engage the eye member 4 of a load carrying bag "B," as shown in FIGURE 2.

Figure 3:
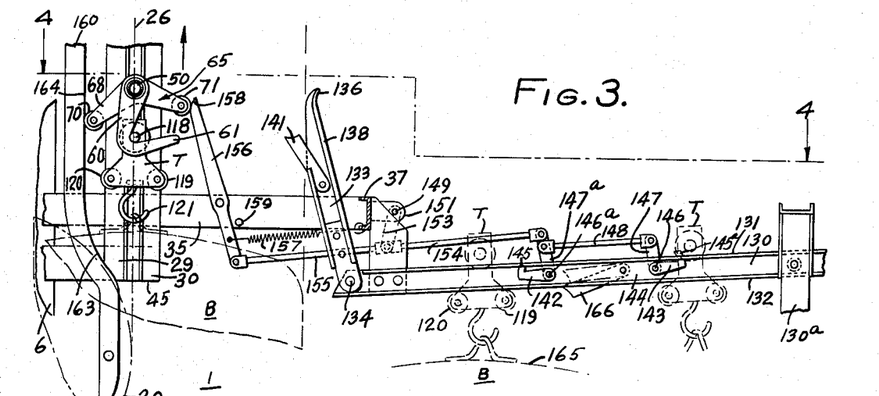
FIGURE 3 is a fragmentary, side elevation on an enlarged scale, of escapement mechanism for controlling the delivery of a load to elevating means.
Figure 4:
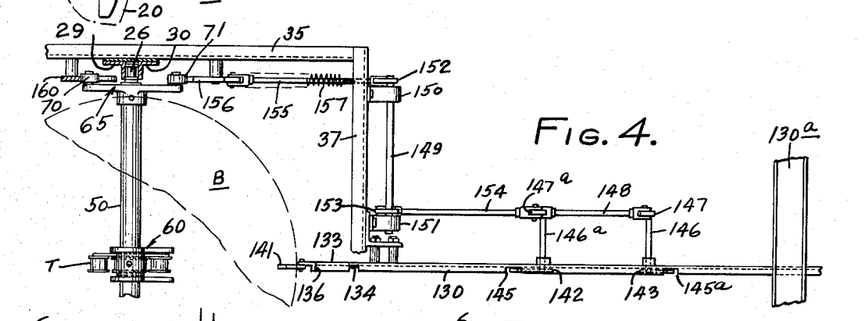
FIGURE 4 is a fragmentary, sectional view on the line 4—4 of FIGURE 3.

Reference is made to FIGURE 2 wherein at the lower level 1 there is provided a channel type fixed rail 130 suitably supported as by a post 130a spaced from the elevator portion of the conveyor. Other supports are, of course, provided to sustain the load to be carried by the individual trolleys. The rail 130 is of channel cross section and tips downwardly or is at a grade which causes the load trolleys thereon to move toward the elevating mechanism of the conveyor. The rail is so mounted that the flanged roller 108 rides on the upper flange 131 thereof while the rollers 119 and 120 engage the lower flange 132. The outer end of the fixed rail 130 is provided with a rail extension 133 which is pivoted at 134 to the fixed rail. This extension 133 is movable from the full line position of FIGURE 2 to the dotted line position thereof shown at 135. It will be noted that the extension has an upwardly curved tip 136 and that the webbing 137 is cut at a slant relative to the upper and lower flanges 138 and 139, as shown at 140. The webbing 137 has pivoted thereto a dog 141 which is capable of dropping under gravity below the flange 139, as shown in full line position in FIGURE 2. The dog 141 prevents backward movement of the load trolley when the load trolley has reached the full line position shown at the lower level 1 in FIGURE 2. Thus, the grade of the fixed rail 130 and the rail extension 133, is such that a load trolley will move automatically from the several dotted positions shown in FIGURE 2 to the full line position thereof at the lower level 1. However, movement of the load trolley is controlled in accordance with timed elevating mechanism. The means for timed elevation of a load includes escapement mechanism illustrated in FIGURES 2, 3, and 4. The escapement mechanism comprises a pair of pawls 142 and 143 in spaced apart relationship and pivotally secured to the web 144 of the fixed rail 130. The upper flange 131 of the fixed rail is provided with transverse openings through which angular ends 145 and 145a of the pawls 142 and 143 may pass so as to alternately project beyond the upper surface of the flange or to be positioned therebelow, as shown in FIGURE 3. Shafts 146 and 146a are provided for each pawl which extend normally from the fixed rail web, the shaft ends being provided with levers 147 and 147a which are interconnected by means of a link 148. Thus, when the link is reciprocated, the angular end of one pawl will be projected beyond the outer surface of the flange 131, the opposite angular end of the other pawl being depressed as shown in FIGURE 3, and vice versa, depending upon direction of reciprocation of the link. As the rail 130 is substantially centered relative to the tubular tie member 50, a portion of the escapement mechanism is in offset relation, as shown in FIGURE 4. Thus, I provide a shaft 149 carried between bearings 150 and 151 mounted on support 37, the shaft provided with levers 152 and 153, with a link 154 interconnecting the lever 147a with the lever 153. A link 155 interconnects the lever 152 with a trip lever 156 which is intermediately pivoted to the cross support 35. Thus, a rocking of the trip lever 156 will produce movement in the link connected levers to reciprocate the pawls 142 and 143. The trip lever 156 is urged to rotate counterclockwise, as shown in FIGURE 3, by means of a tension spring 157 positioned between the lever and particularly the lower half thereof and the transverse support 37. The upper end of the lever 156 is curved at 158 and normally this lever at its curved end is rocked so as to be brought into engagement with roller 71 of the bell crank 65. It is essential that the loaded trolleys be delivered to the point of elevation by the load hooks in timed sequence and the escapement mechanism just described constitutes a simple mechanism for accomplishing this desired object, as when a loaded trolley is elevated, as shown by the dotted line position for bag "B," the bell crank or rocker arm 65 trips the lever 156 and the pawls 142 and 143 allow a following bag to move to a position to be elevated. A stop pin 159 projects from the cross support 35 to limit rotation of the trip lever 156 towards the bell crank or rocker arm 65.

Adjacent column 6 and extending between the upper, intermediate and lower cross supports 35 are strap or bar type cams 160 and 161. Cam 160 is so formed as to engage or disengage the roller 70 of the bell crank or rocker arm 65 during travel of said rocker arm and associated parts upwardly from a lower level to an upper level. Thus, in FIGURE 2, and in the full line position for the lowermost bag "B," trolley, and load hook, the roller 70 engages the lower edge portion of the bar cam 160 at 162. This engagement will maintain the rocker arm in the position shown so as to provide hook engagement with the load trolley for the reason that the rocker arm 65 is fixedly secured to the tubular tie member 50 as is likewise the load hook 60 so that rocking of the bell crank or rocker arm will likewise rock the load hook. The edge of the bar cam 160 is curved inwardly toward the column 6 so that the rocker arm roller 70 may be rocked in following the curve 163, see FIGURE 3, to a straight portion 164. The portion 164 and the portion 162 are in offset relationship. When the bell crank roller 70 engages the straight edge 164 of the bar cam 160, the hook is rotated but still maintains its load support and brings the roller 71 into engagement with the lever 156 as illustrated in FIGURE 3 to rock the lever. Rocking the lever 156 moves the linkage 155, 154 and 148 to move pawls 142 and 143 and release the trolley holding the next bag "B," which would be the position indicated in dotted lines in FIGURE 3 at 165. The following trolley is held by the pawl end 145a moved to obstructing position, as shown. Any retrograde movement of the trolley supporting the bag "B" at 165 is prevented by the gravity operated dog at 166. Thus, during elevation of the hook under discussion with its trolley and load supported by the trolley, the roller 70 maintains the hook so that the trolley cannot move therefrom. However, when the bell crank or rocker arm roller 70 reaches an intermediate level or floor, the roller disengages the strap or bar cam due to curvature 167 thereof (FIGURE 2). This permits the load carrying hook to move from the position assumed at its lower level to a position permitting discharge or release of the load carrying trolley from said hook. If such release is desired at an intermediate level, a pneumatically controlled swing cam 170 (FIGURES 2, 10 and 11) is actuated as to bring the same into position for engagement with roller 71 of the bell crank or rocker arm 65 to produce clockwise rotation of said bell crank or rocker arm and to lower the hook so that the load trolley may be discharged therefrom onto rail 171 and particularly its extension 172 pivoted at 173 thereto. The construction of the pivoted extension of the rail 171 is the same as for the rail 130 at the lower level with the exception that means for actuating the bell crank 65 is not utilized.

Figure 10:
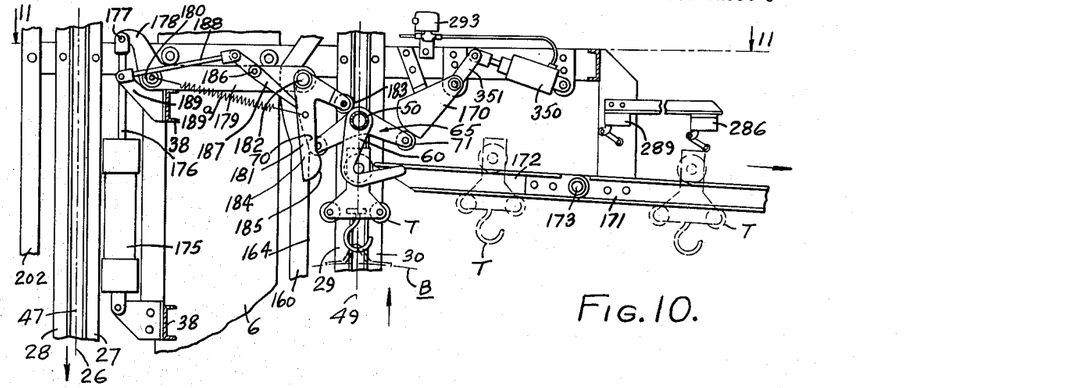
FIGURE 10 is a fragmentary side elevation, on an enlarged scale, and showing mechanism for discharging a load at an intermediate level in a moved position from that of FIGURE 2.

It has been found that mechanism is desirable for boosting movement of the loaded trolley onto the rail extension 172. Such booster mechanism includes the means shown in FIGURES 2 and 10 which includes a cylinder 175 suitably mounted on the column 6, the piston arm 176 of which is pivoted at 177 to an angular end 178 of the lever 179, the lever being pivoted at 180 to structure connected with the column 6. A bell crank 181 is pivoted at 182 to lever 179, the short arm of the bell crank carries a roller 183 while the longer arm 184 has an enlarged curved end 185. Intermediately pivoted at 186 to lever 179 is a lever 187 one end of which is adapted to engage the long arm 184 of the bell crank 181. The opposite end of lever 187 is secured to one end of a link 188, the opposite end of the link being pivotally secured to a bracket 189, the bracket being fastened or secured to suitable structure carried by the column 6. A tension spring 189a has one end secured to the arm 184 while the opposite end of the spring is secured at the pivot point 180 for lever 179. The curved end 185 of arm 184 is positioned as shown in FIGURE 10 so that the load carrying trolley is engaged to boost movement of the same onto the rail extension 172, particularly when the roller 183 engages the hub portion 63 of a load hook, which engagement will rock the bell crank 181 as the load hook is elevated by the link chain. When the booster mechanism for the intermediate floor is not actuated, it assumes the position shown in FIGURE 2, that is to say, out of the way of the load "B" being elevated by a load hook.

Figures 5, 6:
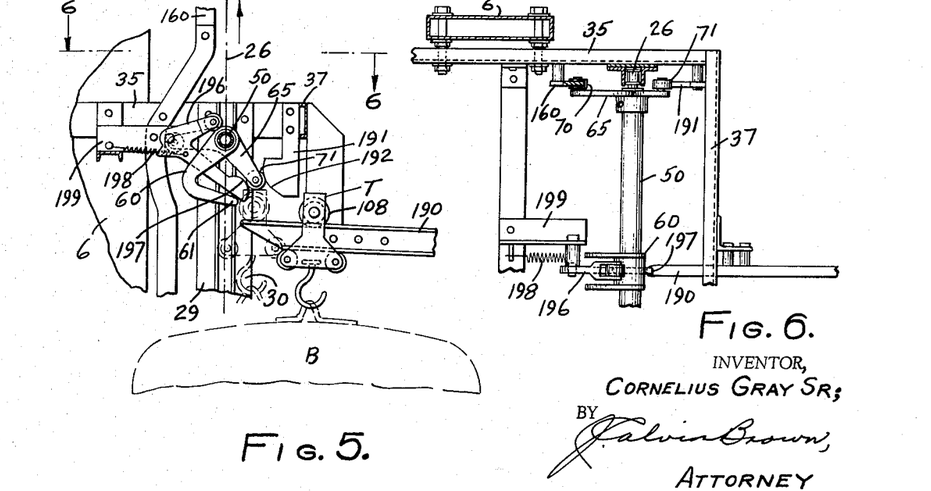
FIGURE 5 is a fragmentary, side elevation illustrating means for discharging a load at a given level.
FIGURE 6 is a fragmentary, sectional view on the line 6—6 of FIGURE 5.

After passing the curved portion 167 of the guide cam bar 160, the cam bar becomes straight and in alignment with the lower portion thereof for engagement with the roller 70 of the rocker arm 65, as shown in FIGURE 2. When the upper level is reached, which is the position known as 3, the fixed rail 190 is in position to receive the load bearing trolley. It will be noted that the rail 190 is inclined so that the trolley will move onto the same by gravity. A fixed bar unloading cam 191 is so positioned that the cam edge 192 thereof is in position to engage the roller 71 of the rocker arm 65 to tip the same and in so doing rock the tubular tie 50 which rocks the load hook 60 so that the load trolley may be discharged onto the rail 190. This position is shown in FIGURE 5 wherein it is to be observed that the cam bar 160 is so constructed as to free the roller 70 from engagement therewith in order that the rocker arm 65 may be tipped by roller engagement 71 with the cam edge 192. In addition to so positioning the load hook that the load trolley may be moved upon the fixed rail 190, I provide a booster means for moving the trolley which comprises a bell crank 195, one arm 196 of which carries a roller, the arm being of such length that the roller may engage the hub 63 of the load hook to rock the bell crank 195 as the load hook moves upwardly. Such roller engagement with the hub 63 of the load hook moves the end 197, comprising an enlarged head, into engagement with the load trolley to give it sufficient push to discharge the load trolley from the load hook. The bell crank 195 is maintained in the position shown in FIGURES 2, 5, and 6, by a tension spring 198 secured between the bell crank 195 and a bracket 199 secured to one of the cross supports 35. After the trolley and its load have been discharged, chain movement being continued, the roller 70 of bell crank 65 follows the edge of the guide cam 160 until a straight portion 200 is reached (FIGURE 2). As the chains continue their movement, both rollers 70 and 71 engage the curved portion of the guide cam bar 161, the curvature following the curvature of the upper sprocket wheel 18. This engagement is illustrated in the dotted line position at 201. Thereafter the guide cam bar parallels the stretch of the chain between the sprocket wheels, as shown at 202 until the curved portion 203 for said guide cam bar is reached, which curved portion follows the curvature of the lowermost sprocket wheel 20 and terminates in an outwardly extended end at 204, at which time the hook is in a position to engage and receive a load carrying trolley.

So far, I have described the loading side of the elevating mechanism and the means of control for lifting a load by means of a load hook. After a load has been removed from a trolley at an intermediate or upper level, the trolleys are adapted to be returned to the lower level. The mechanism for accomplishing this lies adjacent column 7 and is detailed in FIGURES 7, 8, 9, 12, and a modification of certain parts in FIGURE 25.

Figure 26:
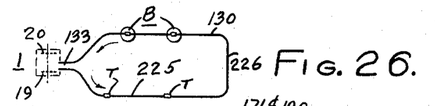
FIGURE 26 is a schematic diagram at the lower level of the conveyor system and means for directing a load to the conveyor for vertical elevation; and, FIGURE 27 is a diagram of a monorail system for returning load hooks at upper, intermediate and other levels to the lower level, or reloading position.
Figure 27:
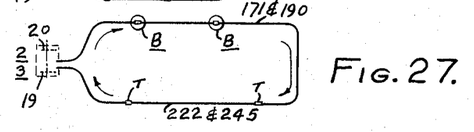

The lowest level or basement has a continuous rail 225, 226 whereby unloaded trolleys are returned for reloading. This is indicated in FIGURE 26. As shown in FIGURE 27, at the intermediate and upper levels the loaded trolleys are deposited onto a rail which is continuous and returns the empty or unloaded trolleys to a point for pick up and return to the loading basement.

Figures 7, 8, 9, 25:
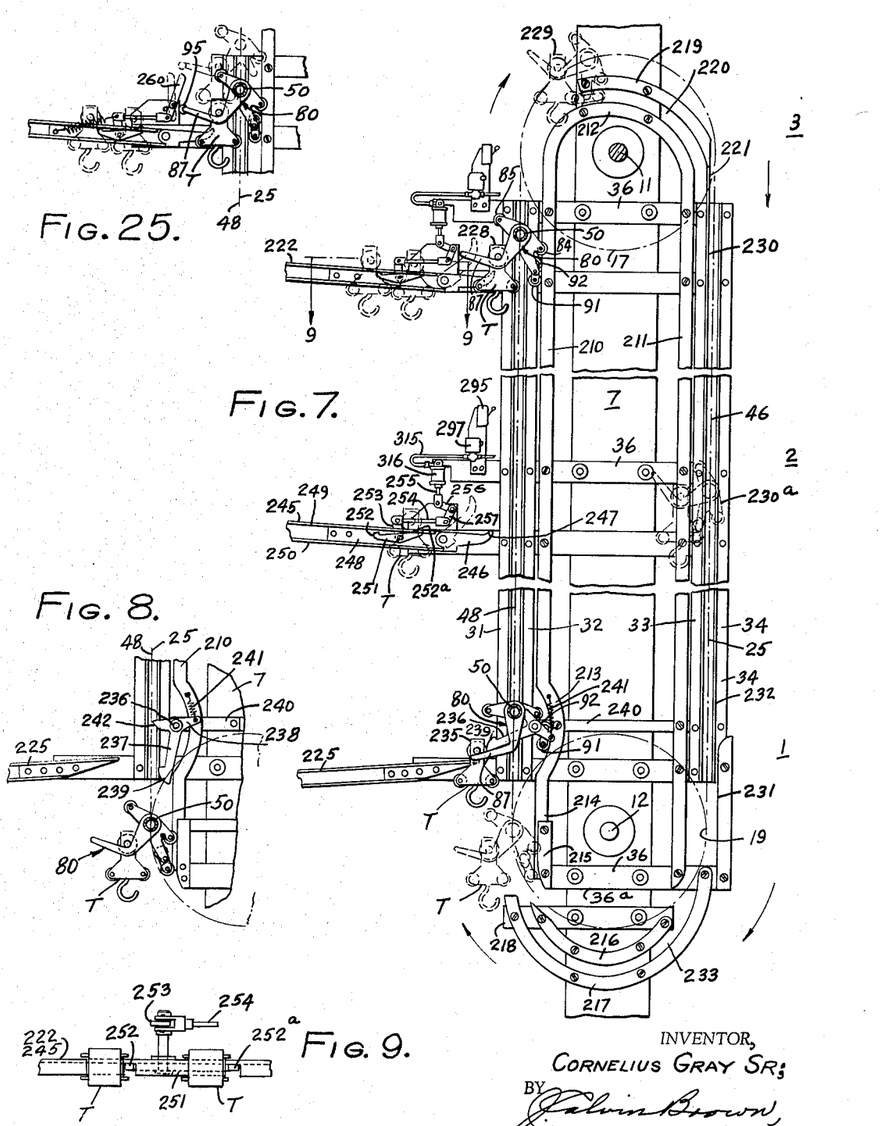
FIGURE 7 is a fragmentary side elevation on the line 7—7 of FIGURE 1, and illustrative of the mechanism for returning empty hook carrying members to a primary loading location.
FIGURE 8 is a fragmentary side elevation at the discharge level showing the position of a load carrying trolley prior to transfer to a monorail.
FIGURE 9 is a fragmentary plan view of escapement mechanism, and taken on the line 9—9 of FIGURE 7.
FIGURE 25 is a fragmentary elevation of modified escapement mechanism.

Reference is made to FIGURES 8, and 9 which show use of the light trolley pick-up hook depicted in FIGURES 22 and 23 for returning to a source; to wit, the basement or lower level, of unloaded trolleys of the type shown in FIGURES 15 and 16. Whereas the load hook of FIGURES 18 and 19 is positioned substantially intermediate the length of a tubular tie member 50, the trolley hook 80 is positioned adjacent the continuous chain 25 and the column 7. See FIGURE 12. It will be observed from FIGURE 23 that the hub 81 is bushed, as shown at 93, and that the hub and its bushing are mounted upon a tubular tie member 50 and held in position by a collar 94, against axial shift of the hub. Thus, the trolley hook 80 is free to rotate upon a tubular tie member 50 and rotation of the tubular tie member 50 by the bell crank or rocker arm 65, shown in FIGURE 20, does not produce any rotation of the trolley hook 80. Spacedly carried by the several cross supports 36 and referring to FIGURE 7 are elongated cam bars 210 and 211 and which cam bars extend throughout the height of the structure; that is to say, the height of the several levels. The cam bars 210 and 211 are substantially straight and parallel and are interconnected at the top with a curved cam bar 212 which may be integral with the cam bars 210 and 211. Cam bar 210 has a curved portion at 213 which is adjacent the lower level or basement and then continues with a straight portion which is in alignment with the portion 210, as shown at 214. A cam bar 215 is laterally offset to the portion 214 of the cam bar 210 for reasons which will be set forth later with relation to movement of the trolley hook 80. It is noted that the end of the cam bar 215 and the end of the cam bar 211 are provided with inwardly curved nose portions and terminate at the cross bar 36 located at 36a. There is provided a curved cam bar 216 which I term an inner cam bar and an outer curved cam bar 217 spaced from cam bar 216. Curved cam bar 216 is suitably supported by support 218, as is likewise curved cam bar 217. However, the curved cam bar 217 is likewise fastened to the cross support at 36a, being spaced from the lower curved nose portion of cam bar 211. The top of the cam bar construction includes a curved cam bar 219 which is spaced from the curved cam bar 212 to leave a curved space or way 220 therebetween, curved cam bar 219 terminating and being joined with an extension of leg 221 of guide bracket 33. It will be noted that the leg of guide bracket 33 is parallel to the straight length of cam bar 211. It is observed that the guide brackets 31 and 32 terminate at the lower level at a point below the offset curved portion 213 of cam bar 210 and at the upper level above return track way 222, the guide brackets 33 and 34 being of the same length as guide brackets 31 and 32. The rail at 225 joins the rail 130, as illustrated in FIGURE 26 by a substantially closed circuit by means of a connecting rail 226. In the case of the intermediate floor, the load carrying rail 171 joins rail portion 245 and for the upper floor rail 190 which joins with the rail 222 for the unloading of the trolleys and return of the trolleys to the light load pick up hooks for return to the loading basement or lower level. The direction of movement of the chain, as shown in FIGURE 7, is in accordance with the arrows. The assumption is made that an unloaded trolley is ready to be engaged by the hook arms 87 and 88 which are so spaced as to engage the sleeves 117 and 118 which surround the axle 112. I am assuming that the trolley at the level 3 has been moved on the rail 222 to a position where the pick up hook will engage the sleeves for the axle 112 of the trolley. The trolley will be in the position shown at 228 and wherein the rollers 91 and 92 carried by the arm 90 ride against the edge of the cam bar 210. This holds the hooks 87 and 88 in position to carry the trolley with the trolley hook 121 facing inwardly, as shown. The rollers 84 and 85 are disengaged. As the light load trolley hook 80 continues upward movement from level 3, the chain passing around upper sprocket 17, indicated by dotted lines in FIGURE 7 and in full lines in FIGURE 1, the rollers 91 and 92 are received in the way 220 between the curved cam bars 212 and 219, thus maintaining hook engagement with the trolley, shown by dotted lines at 229. In other words, the position of the trolley engaging hooks remains the same during this movement and transfer to a position between the cam bar 211 and the vertical leg of guide bracket 33, being leg 230, as shown by the broken line position at 230a. Movement of the hook and trolley continues as the continuous chain is moved around the lower sprocket 19, the rollers 91 and 92 escaping at the lower end from between the bracket leg 230, and cam bar 211 which positions roller 84 for engagement with a cam bar 231 which is adjacent the vertical leg 232 of guide bracket 34. Thus, the hook is still maintained in a position to hold a load trolley and as the chain passes around the sprocket wheel 19, the rollers 91 and 92 of the trolley hook are received in the way 233 between the curved cam bars 216 and 217 to maintain the hook in position to hold the trolley. The rollers 91 and 92 engage the straight cam bar 214 as the hook is moved upwardly until said rollers are received in the curved portion 213 and the hook is in a position to release the trolley onto the rail 225, as shown in the full line position at 235. However, release of the trolley is assured by the booster 236. Booster 236 is illustrated in inoperative position in FIGURE 8 and the booster consists of an elongated arm 237 and a cross arm 238 at one end of arm 237. Arm 237 has a head 239, the edge of which is curved, and the cross arm is mounted to swing relative to a support 240. A tension spring 241 is attached to the cross arm and to the curved portion 213 of the cam bar to move the arm 237 against the cam bar, as shown in FIGURE 8. When the hook 80 with its trolley moves upwardly from the position of FIGURE 8 to that of FIGURE 7, the outer end of the cross arm, and particularly the beveled edge 242 thereof engages the hub 81 of the trolley hook and in so doing moves the arm 237 between the hooks 87 and 88 to push the trolley from the hooks 87 and 88, as shown in FIGURE 7. As the continuous chain is constantly moving, the rollers 91 and 92 which position the hooks 87 and 88 move from the portion 213 of the cam bar 219 and engage the straight edge thereof above the portion 213 which brings the hooks 87 and 88 in a position to engage the shaft or axle of a trolley. This is a controlled movement and may be accomplished either mechanically or pneumatically. I assume the intermediate level 2 for the conveyor system. A rail 245 has a downward grade so as to cause trolleys to move upon the same under gravity. This rail would correspond to the rail system shown in FIGURE 27. However, rail 245 has a pivoted end rail section 246 provided with an upturned tip 247 (FIGURE 7). Rail 245 is of channel form the same as the other rails described for the invention; that is to say, it has a web 248 and upper and lower flanges 249 and 250. Rockably secured to the web is an intermediately pivoted pawl 251 having upturned ends 252 and 252a. The upturned ends are adapted to be alternately projected through openings in the flange 249 when the pawl is rocked. The pawl 251 may be rocked by an arm 253 secured at the pivot point for the pawl which arm 253 is connected by a link 254 to a plunger 255 secured to said link by links 256 and 257. When the plunger is moved in one direction pawl 251 is rocked so as to position either the end 252 above the flange 249 or to move the upstanding end 252a above the flange while depressing the end 252. The plunger 255 is actuated as hereinafter described. The arrangement is such that a single trolley at a time is released for hook engagement and following trolleys are held upon the rail 245 until the trolley has been lifted sufficiently to clear and permit another trolley to be received in position for engagement with a following hook. The upstanding end 247 of the pivoted rail 246 moves upwardly to the dotted line position shown as the trolley hook moves upwardly.

FIGURE 25 illustrates mechanical means for rocking the pawl 251 and wherein the link 254 (the numbers remaining the same so far as is applicable for like parts), is connected to a lever 260. This lever is in a position to be engaged by the roller 95 carried by the outer end of the hook member 87 and in so doing will move the lever from the full line position in FIGURE 25 to the dotted line position thereof, to rock the pawl and to block movement of a following trolley upon the rail 245 until the trolley hook has moved upwardly to the dotted line position in FIGURE 25 whereupon a following trolley is released for movement to position the same hook engagement. The upper level operates upon the same principle as the intermediate level and has a tipping end rail and, accordingly, the same numbers as apply to the intermediate level will likewise apply to the upper level.

Figure 24:
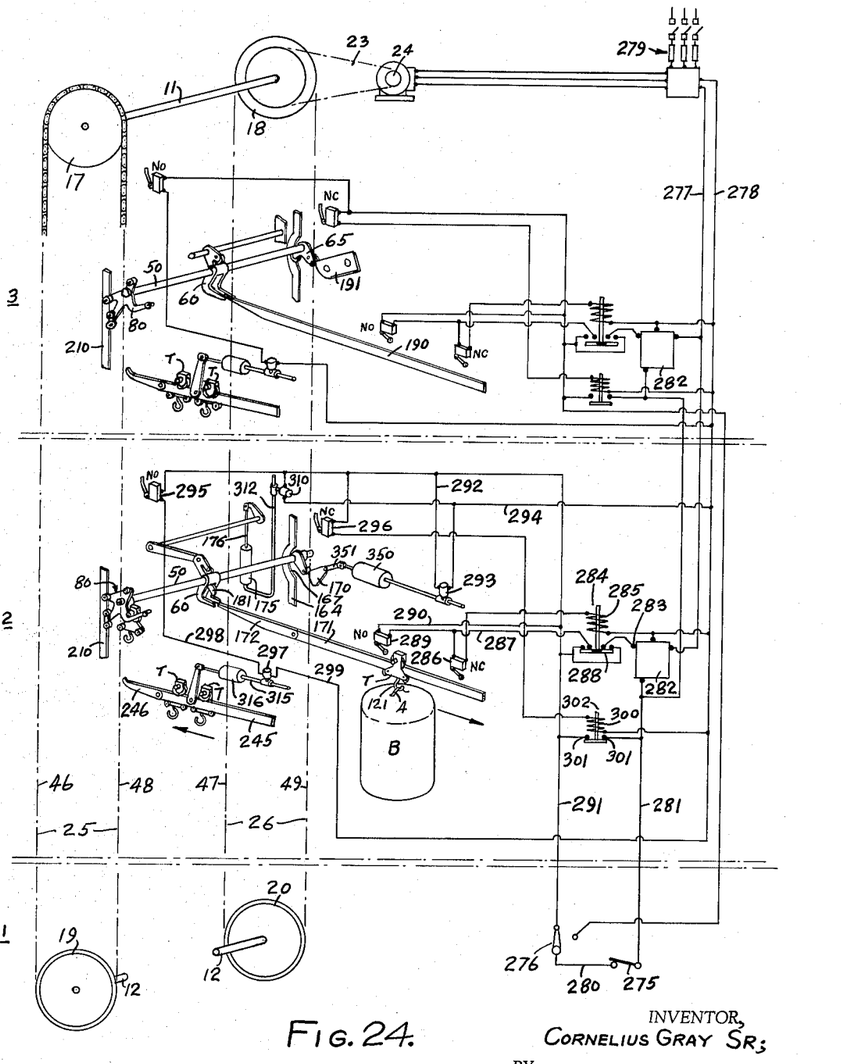
FIGURE 24 is a wiring diagram for controlling the loading and the discharging of a load for different levels of the conveyor system.

Reference is now made to FIGURE 24 which illustrates a wiring diagram and associated electrical elements, all of which are conventional in the art.

The mechanical elements illustrated in connection with the electrical elements have previously been functionally described in reference to the conveyor system.

Three floors are illustrated with the electric circuitry required for the proper operation of the device at each floor, it being understood that any number of intermediate floors may be used.

Conductors 277 and 278 represent the hot lines of an ordinary 110 volt A.C. circuit. At the basement or lower level where the loaded bags are automatically transferred to the conveyor system, I provide only a selector switch 276 manually operated to select the floor onto which the loaded bag is to be deposited and a starting switch 275.

As shown, intermediate floor 2 has been selected, the operator then presses starting switch 275 which closes the magnetic holding switch 279 furnishing three phase 220 volt A.C. to the drive motor 24.

The starting switch 275 also energizes the hold relay 302 through conductor 277, time delay switch 282 which is normally closed, conductors 281, 280, selector switch 276, conductor 291, micro-switch 296, energizing coil 300 to conductor 278, the contacts 301 on the hold relay 302 shunting the energizing coil 300, thus furnishing the electrical means for energizing the electrical components, after starting switch 275 is released, and until the hold relay 302 is automatically released either by the operation of switch 296 normally closed, or by the time delay switch, the operation of which will now be described.

It will be noted that the time delay switch 282 has four connections, connection 283 leading to the activating coil of the time delay switch and through it to conductor 277, it is also connected to one contact of a four contact holding relay 284. This holding relay 284, as shown in the circuit of the intermediate floor has been activated by the action of the loaded container B passing micro-switch 289 through conductor 290, switch 289, conductor 287 contact plate 288 and conductor 291 and causing said relay to act as a holding relay activating the time delay switch 282 until the loaded container in passing micro-switch 286 opens the circuit of coil 285 which releases the holding relay 284 thereby stopping the action of the time delay switch and permitting the continued operation of the conveyor. Should the loaded container B be delayed or stopped by accumulated loaded containers B already delivered to the intermediate floor the loaded container B on track 171 could not operate micro-switch 286, the coil 285 would remain activated and at the predetermined interval the time delay switch would operate to break the circuit of conductor 281 releasing the hold relays 302 and 279 thereby stopping the operation of the drive motor and conveyor.

The circuitry for the four pole holding relay 284 when not energized, is shown for the top floor.

By means of conductors 291 and 292, solenoid valve 293 is connected through conductor 294 across conductors 277 and 278. Lead 291 likewise is in circuit with micro-switches 295 and 296, micro-switch 295 being in series with a solenoid valve 297 by lead 298 and through lead 299 with lead 277 leading to the magnetic switch 279.

The micro-switch 196 which connects with the lead 291 is likewise in circuit with a terminal of the coil 300 of a hold relay 302, the other contact from the coil connecting with lead 277. The relay arm 301 of the hold relay is adapted to bridge a pair of contacts when the coil 300 is energized, which contacts are separately connected to leads 281 and 291 thereby completing a circuit to the time delay switch 282 and the micro-switches when the relay is energized and independent of any movement of the selector switch, after the particular level for discharge of a load has been determined by the operator. An electrically operated solenoid valve is provided at 310 and the solenoid windings are in circuit with the leads 291 and 278. This solenoid valve is adapted to control the flow of pressure air through a line 312 to cylinder 175, the piston arm 176 of which positions the bell crank 181 and associated mechanism as illustrated in FIGURE 10. The solenoid valve 297 controls the flow of pressure air through line 315 to cylinder 316, the piston of which controls the movement of the pawl 251, see FIGURE 7, through linkage to rock the pawl and control movement of unloaded trolleys on rail 245.

The cam 170 is rocked to the position shown in FIGURE 10 by means of pressure air controlled as to flow by the solenoid valve 293, the air line being connected to cylinder 350, the piston within the cylinder and particularly the arm thereof being connected through linkage 351 with the cam 170.

The connections for the upper floor are similar with the exception that in place of using a movable cam such as 170 I provide the fixed cam 191.

The operation, uses and advantages of my invention are as follows.

My invention is adaptable for many uses other than the carrying of soiled laundry from one location to another for washing, ironing and the like, in that any object whether liquid or solid, such as meat products, cement, oil, or simply parts which may be attached to and supported by a hook may be conveyed by my system and means. Preferably the object carried by the hook or hooks should be standardized as to diameter. So far as diameter of the bag or container "B" as shown in the drawings is concerned, the classifier which I have indicated in FIGURE 2 by the post 130a includes a series of spaced apart posts which allow bags of given diameter to be passed between the posts for hooked connection with a load trolley. Obviously a bag of greater diameter than the spacing between two posts would not pass. As stated, while I have shown a single post, multiple posts are contemplated to perform the classifying operation. I have shown in my drawings bags of a certain diameter so as to be readily accommodated between the continuous chains 25 and 26, as shown in FIGURE 1, and engaged by the load hooks 60, which load hooks are substantially centrally positioned on tubular tie members 50. Thus, having chosen the character of material to be transported from a lower level to a higher level, such material is carried by a load trolley and sequentially fed by escapement mechanism related to the rail 130 in timed sequence to an elevating load hook 60. Having preselected the floor at which delivery is to be made, of the bag carried by the load hook in accordance with the circuitry described for FIGURE 24, the bag or load with its load trolley will be directed on to a rail at which point the load in the bag or the load itself may be removed from the load trolley and the load trolley returned empty to an unloaded trolley hook to the lower level for reloading, as depicted diagrammatically in FIGURES 26 and 27. All intermediate floors which are the floors included between the top floor and the lowermost floor or basement operate in accordance with FIGURE 24 and particularly the circuitry and apparatus depicted for a typical intermediate floor. The top floor has its circuit and means so arranged that the loaded containers are all unloaded thereat, if not previously unloaded at an intermediate floor. Thus, as shown in FIGURE 24, I utilize a fixed cam at 191 which operates the bell crank 65 on each tubular tie member 50 to rock the tubular tie member 50 and in so doing rock the load carrying hook 60 to direct a load trolley onto the fixed rail 190. So far as intermediate floors are concerned, an intermediate floor, if selected by the selector switch 276, will position the movable cam 170 so as to actuate the bell crank 65 and rock the tubular shaft member 50 to effect an unloading of the load trolley from the load hook 60. The micro-switches 286 and 289 are so spaced and related that proper sequence in the unloading of the loaded container "B" will always occur under normal circumstances, but in case of a jam or improper sequence of unloading, the entire electrical system will function to stop operation of the conveyor system.

The load trolley construction is such that it is readily carried on a monorail without side sway so that the load trolley will always be properly picked up by the load hooks as they move vertically and in timed sequence. Thus, in FIGURE 2 the lowermost bag "B" has its loop 4 engaged by the hook 121 of the load trolley and the load trolley in turn is engaged by the load hook 60 so positioned for engagement by the bell crank 65 which has its roller 70 engaging the cam bar 164, it being remembered that the bell crank 65 controls the turning movement of the tubular tie member 50 upon which the load hook is fixedly mounted. Thus, the load hook has been turned so as to readily engage the sleeves 117 and 118 of the load trolley, which load trolley has been delivered to a point for engagement with said load hook from the monorail extension 133. As the load hook moves upwardly carrying with it the bag "B," the bag will strike the extension 133 and move it upwardly from the full line position of FIGURE 2 to the dotted line position and allow the bag to pass. As the bag passes upwardly, the roller 71 engages the lever 156 to rock the same and operate the escapement means which includes the dogs 142 and 143 to permit a further load trolley with its bag or load to move forwardly so that the trolley will be lifted or elevated by a load hook. This sequence is followed as long as there is a load to be elevated and during the continuance of operation of the unloading of the bags or containers at selected floors. The unloaded load trolleys are returned in timed sequence to an empty trolley hook for return to the lower floor for use in reloading. The escapement mechanism for such timed return of the load trolleys depicted in FIGURES 7, 8 and 25, has been fully described in the statement of operation, particularly that of FIGURE 24, which statement of operation and sequence will not be repeated.

I claim:

1. Conveyor apparatus for moving a load from a lower level to a higher level and discharging the same at said higher level, including: a substantially horizontal rail having a discharge end at the lower level, a trolley capable of being rolled on said rail for carrying a load, elevating means including a hook for engagement with the trolley to lift the trolley and its load when the trolley reaches the discharge end of said rail, means for maintaining the hook in engagement with said trolley until the elevating means has raised the trolley to the point of discharge at the higher level for the load, and means for automatically releasing said hook engagement with said trolley to discharge the trolley and its load at said higher level.

2. A conveyor apparatus for conveying a load from a lower level to a higher level for discharge at the higher level, including: rails at both the lower level and higher level, a trolley movable on the lower level rail and adapted to carry a load, elevating mechanism between the upper and lower rails, said elevating mechanism including a load hook and means for causing the load hook to engage the trolley at the lower level while the elevating mechanism is operating to remove the trolley and its load from the lower rail, said elevating mechanism lifting the load hook and its loaded trolley to the higher rail, and cam means at the higher level automatically operating on said hook for releasing the trolley and its load from said hook onto the higher rail.

3. Conveyor apparatus including: a spaced parallel pair of continuous chains the reaches of which chains are adapted to move vertically, upper and lower pairs of sprocket wheels over which said continuous chains are passed and power means for driving said sprocket wheels to move the chains; tie tubes loosely mounted for rotation between the parallel chains, said tie tubes being spaced apart throughout the lengths of said continuous chains, a load hook secured to each tie tube substantially intermediate the length thereof, a rocker arm secured to each tie tube, an elongated cam bar positioned adjacent one of the continuous chains, the rocker arm adapted to engage the cam bar as the continuous chains are moved to rock the tie tube and the load hook; rails positioned at a lower and a higher level, a load trolley for carrying a load on the lower rail, means for positioning the load trolley so as to be engaged by a load hook during movement of the continuous chains, to elevate the load trolley and its load to the higher level, rocker arm engagement with the cam bar maintaining hook engagement with the load trolley during elevation thereof to the higher level, the cam bar releasing the rocker arm at said higher level to discharge the trolley from the load hook onto the upper rail.

4. A vertical conveyor system and means which includes a load trolley for movement on a rail, the load trolley having a frame, a flanged wheel, and an axle passed through the frame for securing the flanged wheel, the axle having both ends extending a substantial distance beyond the flanged wheel so that both ends may be supported by conveyor-carried hooks, the frame, and the frame provided with a pair of rollers positioned on both sides of the flanged wheel and spaced below the flanged wheel, and a load hook depending from and fixedly secured to said frame, the hook lying in the general plane of the flanged wheel and said rollers.

5. In conveyor apparatus: a pair of spaced apart substantially parallel continuous chains, pairs of upper and lower sprockets over which said chains are passed, means for rotating the sprockets to cause travel of the chains, tie members spacedly secured between said chains in substantially right angular relationship to the chains, said tie members being secured to the chains for free rotation, a rocker arm secured to each tie member adjacent one of the continuous chains, a cam bar adjacent the same continuous chain for contact with the rocker arm, and a load hook carried intermediate the length of each tie member, the cam bar controlling the rotation of the rocker arm and the load hook, and monorails at both the lower level and the upper level and terminating adjacent the load hooks, a load trolley carried on the monorail at the lower level adapted to be engaged by a load hook to elevate the load trolley and its load as the tie member is elevated by the continuous chains, said cam bar holding the rocker arm so that the load hook supports the trolley until the trolley reaches the upper level, the cam bar releasing the rocker arm at the upper level to free the load trolley from said load hook onto the upper monorail.

6. The device of claim 5, and means for automatically boosting movement of the load trolley on to the upper level monorail as the load hook moves upwardly.

7. Conveyor apparatus for moving a load from a lower level to a higher level, comprising: means extending between the levels for elevating a load, said means including vertical supports extending from the lower level to the higher level, a pair of continuous chains in spaced apart parallel relationship and positioned adjacent said supports, upper and lower sprocket wheels journalled in said supports, over which sprocket wheels said continuous chains are passed and means for rotating the sprocket wheels to produce simultaneous movement of the continuous chains; spaced apart tie members extending between the pair of chains and means rotatably mounting the tie members at each end thereof to said chains; a load hook centrally mounted on each tie member for rocking movement as the tie member is turned, a rocker arm secured to each tie member and positioned adjacent a first of said continuous chains, each end of the rocker arm provided with a roller, a vertically positioned cam bar extending between the upper and lower levels, one roller of the rocker arm engaging said cam bar to produce rocking movement of the load hook when the tie member is turned during movement of the continuous chains, a load trolley and a rail therefor directing the load trolley to a position to be engaged by a load hook, means to hold the trolley engaged by the load hook during movement thereof between the lower and the higher levels; rocking movement of the load hook by the rocker arm in one direction, disengaging the load hook from the trolley at the higher level.

8. In conveyor apparatus of the character disclosed, a rail, a load trolley for movement on the rail, said load trolley comprising: a framing, a flanged wheel at the upper end of the framing for supporting said framing on the rail, a pair of rollers carried by the framing at its lower end and spaced from the flanged wheel, the rail being positioned between the rollers and the flanged wheel, a fixed hook depending from the framing for supporting a load and positioned between the rollers, and an axle securing the flanged wheel to the framing, said axle extending a substantial distance beyond both sides of the flanged wheel and framing to provide projections which may be grasped by conveyor-carried hooks.

9. The conveyor apparatus as set forth in claim 8, and elevating means for lifting the load trolley from said rail, comprising a vertical chain conveyor carrying a bifurcated load hook adapted to receive the framing and flanged wheel therebetween for engagement with the extended ends of the axle.

10. In conveyor apparatus of the character disclosed, a light trolley pick-up hook comprising a hub, a pair of spaced apart parallel hooks extending from the hub, a pair of arms secured to the hub and lying in the plane of one of the hooks, said arms provided with rollers at the ends thereof, and an intermediate arm between one of the first named arms and one of the hooks, and lying in the plane of said arm and hook, an arm intermediately pivoted to said intermediate arm and a pair of rollers at ends of said intermediate arm.

11. Conveyor apparatus for moving a load from a lower level to a higher level comprising: means extending between said levels for elevating a load, said means including vertical supports extending from the lower level to the higher level, a pair of continuous chains in spaced apart parallel relationship and positioned adjacent said supports, upper and lower sprocket wheels journalled in said supports, said continuous chains being passed over said sprocket wheels, and means for rotating the sprocket wheels to produce simultaneous movement of the continuous chains; spaced apart tie members extending between the pair of chains, and means rotatably mounting the tie members at each end thereof upon said chains; a load hook centrally fixed upon each tie member for rocking movement as the tie member turns on its axis, said load hook including a hub and a pair of spaced-apart parallel hooks extending from said hub; a rocker arm secured to each tie member and positioned adjacent one of said continuous chains, each end of each rocker arm being provided with a roller; a vertically positioned stationary cam bar extending between said upper and lower levels, one roller of each rocker arm engaging said cam bar, as the continuous chains travel, to turn the tie member on its axis and rock the load hook; a load trolley having an extended axle adapted to be engaged at its opposite ends by said spaced apart hooks, the load trolley being positioned therebetween; a rail at a lower level over which the load trolley with a load may roll, said rail directing the load trolley to a position wherein it will be engaged and lifted by an upwardy traveling load hook; means to hold the trolley engaged by the load hook during elevation of the trolley to a higher level; rocking movement of the load hook by the rocker arm acting to disengage the load hook from the trolley at the higher level.

12. A conveyor apparatus for conveying a load from a lower level to a higher level for discharge at the higher level, including: rails at the lower and higher levels; a trolley movable on the rails at both levels and adapted to carry a load; elevating mechanism between the upper and lower rails, said elevating mechanism including a load hook; means for causing the load hook to engage the trolley at the lower level, while the elevating mechanism is operating, to remove the trolley and its load from the lower rail; said elevating mechanism then lifting the load hook and the loaded trolley carried thereby to the higher rail; cam means at the higher level automatically operating on said load hook for releasing the trolley and its load to move onto the higher rail; and booster means comprising a bell crank, one arm of which is engaged by the load hook during elevation thereof to swing the other bell crank arm against the load trolley to positively move the load trolley onto said higher rail.

13. Conveyor apparatus including: a spaced parallel pair of continuous chains whose reaches are adapted to move vertically, upper and lower pairs of sprocket wheels over which said chains are passed, and power means for driving said sprocket wheels to move the chains; tie tubes extending between the parallel chains and loosely mounted for rotation on their axes, said tie tubes being spaced apart throughout the lengths of said continuous chains; a load hook secured to each tie tube intermediate the length thereof, and a rocker arm secured to each tie tube; an elongated cam bar fixed adjacent one of the continuous chains, the rocker arms being adapted to engage the cam bar as the chains are moved to cause rocking of the tie tubes and the load hooks fixed thereto; rails positioned at a lower and a higher level; a load trolley movable over the lower rail while carrying a load; means for positioning the load trolley so as to be engaged by a load hook during movement of the chains to elevate the load trolley and its load to the level of the upper rail; rocker arm engagement with said cam bar maintaining hook engagement with the load trolley during elevation thereof; the cam bar releasing the rocker arm at the proper level to release said load hook engagement and permit movement of the trolley onto the upper rail; a light trolley pick-up carried on each tie rod and free to rotate thereon, said light trolley pick-up hook being positioned adjacent the second of said continuous chains, a cam bar for engagement with said light trolley pick-up hook to control the position of the hook, rails terminating adjacent the pick-up hooks for each level of operation, the lower level rail connecting with the lower level load-receiving rail whereby an empty load trolley is returned to the lower level for reloading of the load trolley.

14. The conveyor apparatus as set forth in claim 13, and cam means adjacent the second continuous chain and said sprockets to maintain a light load trolley in engagement with the light trolley pick-up hook during movement of the continuous chains and to release the light load trolley onto the rail at the lowest level.

15. The conveyor apparatus as set forth in claim 14, and means for feeding light load trolleys intermittently from a rail at a higher level to the light load pick-up hooks during elevation of said hooks.

16. Conveyor apparatus for moving a load from a lower level to a higher level comprising: means extending between said levels for elevating a load, said means including vertical supports extending from the lower level to the higher level, a pair of continuous chains in spaced apart parallel relationship and positioned adjacent said supports, upper and lower sprocket wheels journalled in said supports, said continuous chains being passed over said sprocket wheels, and means for rotating the sprocket wheels to produce simultaneous movement of the continuous chains; spaced apart tie members extending between the pair of chains, and means rotatably mounting the tie members at each end thereof upon said chains; a load hook centrally fixed upon each tie member for rocking movement as the tie member turns on its axis, said load hook including a hub and a pair of spaced-apart parallel hooks extending from said hub; a rocker arm secured to each tie member and postioned adjacent one of said continuous chains, each end of each rocker arm being provided with a roller; a vertically positioned stationary cam bar extending between said upper and lower levels, one roller of each rocker arm engaging said cam bar, as the continuous chains travel, to turn the tie member on its axis and rock the load hook; a load trolley having an extended axle adapted to be engaged at its opposite ends by said spaced-apart hooks, the load trolley being positioned therebetween; a rail at a lower level over which the load trolley with a load may roll, said rail directing the load trolley to a position wherein it will be engaged and lifted by an upwardly traveling load hook; means to hold the trolley engaged by the load hook during elevation of the trolley to a higher level; rocking movement of the load hook by the rocker arm acting to disengage the load hook rrom the trolley at the higher level; and means for boosting movement of the load trolley onto a receiving rail at the higher level, said boosting means comprising a bell crank, one arm of which is adapted to engage the hub of the load hook during movement of the continuous chains to swing the other bell crank arm between the spaced hooks of the load hook for engagement with the load trolley to forcibly move the load trolley onto said receiving rail.

References Cited by the Examiner

UNITED STATES PATENTS

| | | | |
|---|---|---|---|
| 299,393 | 5/1884 | Jenkins | 104—93 |
| 741,918 | 10/1903 | Mackrow | 198—177 |
| 1,447,227 | 3/1923 | Sanborn | 246—184 |
| 2,100,821 | 11/1937 | Sim | 198—20 |
| 2,318,180 | 5/1943 | Morse | 104—88 |

FOREIGN PATENTS 1,050,175  8/1953  France.

EVON C. BLUNK, *Primary Examiner.*

RICHARD E. AEGERTER, SAMUEL F. COLEMAN, *Examiners.*